United States Patent [19]

Tsang et al.

[11] 4,092,264
[45] May 30, 1978

[54] BARIUM OXIDE COATED ZIRCONIA PARTICLE FOR USE IN AN OXYGEN EXTRACTOR

[75] Inventors: Peter Hing-Shya Tsang, Southfield; Richard W. Hradek, Royal Oak, both of Mich.; James Daniel Bode, Davenport, Iowa

[73] Assignee: The Bendix Corporation, South Bend, Ind.

[21] Appl. No.: 754,466

[22] Filed: Dec. 27, 1976

[51] Int. Cl.$^2$ ............................................. A61L 13/00
[52] U.S. Cl. .................................. 252/186; 423/219; 423/593; 423/583
[58] Field of Search ............... 423/593, 219, 579, 583; 252/186; 23/281

[56] References Cited

U.S. PATENT DOCUMENTS

| 432,815 | 7/1890 | Brin | 423/219 |
|---|---|---|---|
| 2,418,402 | 4/1947 | Gorin | 423/219 |
| 3,310,381 | 3/1967 | Guerrieri | 423/219 |
| 3,773,680 | 11/1973 | Huebler et al. | 252/186 |
| 3,903,010 | 9/1975 | Massey et al. | 252/186 |
| 3,904,486 | 9/1975 | Faurschou et al. | 252/186 |

*Primary Examiner*—Benjamin R. Padgett
*Assistant Examiner*—Josephine L. Barr
*Attorney, Agent, or Firm*—Leo H. McCormick, Jr.; Ken C. Decker

[57] ABSTRACT

A process of manufacturing an oxide material for use in an oxygen generator. A quantity of dry zirconia particles is blended with Barium Peroxide particles and thereafter heated in a nitrogen atmosphere until the Barium Peroxide melts and coats the zirconia particles. The Barium Peroxide coating is subsequently decomposed to Barium Oxide. The Barium Oxide coated zirconia particles are allowed to cool and then passed through a grinder to produce a uniform particle size for oxide material.

10 Claims, 2 Drawing Figures

BARIUM OXIDE COATED ZIRCONIA PARTICLE FOR USE IN AN OXYGEN EXTRACTOR

BACKGROUND OF THE INVENTION

For a time, oxygen was commercially produced by the Brin process which is completely disclosed in U.S. Pat. No. 432,815. In the Brin process, beds of barium oxide particles are heated in a chamber to a temperature of between 700°–750° C. This temperature is maintained substantially constant and clean, dry air under pressure is passed through the chamber. The barium oxide reacts with the oxygen in the air to form barium peroxide while nitrogen is released as a by-product. After a period of time, the flow of the pressurized air is interrupted and the chamber is connected to a source of vacuum. As the gas in the chamber is evacuated, the barium peroxide releases the earlier acquired oxygen as it reverts back to barium oxide. The released oxygen is captured and communicated to a storage container for later use.

From experimentation, it was determined that the efficiency of the Brin process could be increased if the temperature of the barium oxide particles could be maintained at a constant temperature. The reaction between oxygen in the air and the barium oxide increases with temperature and reaches a maximum near the melting point of the barium oxide. Unfortunately, maintaining the temperature of the chamber at a constant temperature requires sophisticated heaters to prevent fluctuation in the chamber temperature since the barium oxide particles are alternately being subjected to air under pressure from outside the chamber and vacuum and also since the heat of reaction removes heat from and supplies heat to the barium oxide particles. In addition, the barium oxide particles located nearer the heaters receive the greatest heat while the barium oxide particles away from the heater are relatively cooler. In an effort to heat the barium oxide particles farthest away from the heaters, the temperature of the barium oxide particles adjacent the heater approach the melting temperature. Unfortunately, the heat generated through the reaction of air and the barium oxide and the chamber temperature is additive, and at time sufficient to cause the barium oxide particles to melt and fuse into a larger mass. This is not too serious a problem during the reaction part of the process since the pressure of the air flowing through the chamber can be increased to maintain uniform flow through the bed. However, channels and cracks form in the bed of barium oxide particles during the oxygen evacuation part of the cycle resulting in deterioration of the barium oxide beds since the air flow thereafter is not uniform.

SUMMARY OF THE INVENTION

In an effort to sustain the efficiency of barium oxide-barium peroxide in an oxygen extractor, we discovered a composition of material which absorbs the heat of reaction created between oxygen in the air and barium oxide to thereby maintain the operating temperature below the melting temperature of the barium oxide. The composition of material is created by blending dry zirconia particles with barium peroxide particles until a uniform mixture develops. The uniform mixture is placed in an oven having a nitrogen atmosphere. The uniform mixture is heated until the barium peroxide particles melt and coat the zirconia particles. The barium peroxide coated zirconia particles are cooled in a nitrogen atmosphere and thereafter passed through a grinder to establish a uniform particle size for the barium peroxide coated zirconia particles.

When these barium oxide coated zirconia particles are used in the oxygen extractor, the barium oxide reacts with the oxygen in the pressurized air to create barium peroxide while producing nitrogen as a by-product. The heat created by the reaction of oxygen and barium oxide is carried into the zirconia particle through conduction. Any increase in the temperature in the chamber during the oxidation portion of the cycle is dissipated through the evacuation of air from the chamber during the oxygen release portion of the cycle. In addition the heat absorbed into the zirconia particles is returned to the coating during the release of oxygen. Thus, the temperature in the chamber is maintained within a set range below the melting point of barium oxide during an operating cycle of the oxygen extractor.

It is the object of this invention to provide an oxygen extractor with a composition of material which has heat capacity to absorb the heat caused by reacting barium oxide with oxygen in pressurized air to stabilize the reaction temperature below the melting point of barium oxide to provide a faster and more complete reaction.

It is another object of this invention to provide an oxygen extractor with a composition of material which has structural strength to sustain vigorous pressure cycling at elevated temperatures.

It is another object of this invention to provide a process for manufacturing a composition of material for use in a barium oxide-barium peroxide oxygen extractor.

It is a further object of this invention to provide an oxygen extractor with a barium oxide coated zirconia particle for separating oxygen from air.

These and other objects will become apparent to those who read this specification and view the drawing.

DETAILED DESCRIPTION OF THE INVENTION

Figure 1:
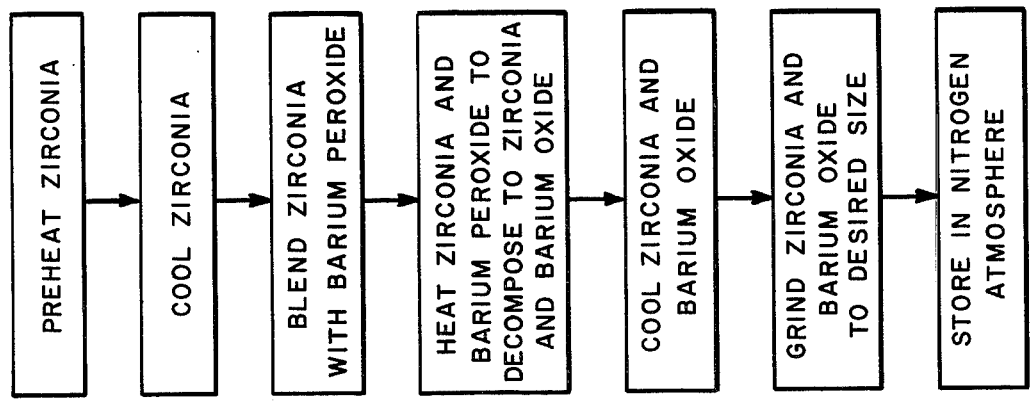
FIG. 1 is a flow chart showing a method of manufacturing an oxide composition of material according to the principles of this invention.

Referring now to the drawings, FIG. 1 illustrates a process for making a composition of material for use in an oxygen extractor according to the principles of this invention.

The composition of material consists of a zirconia particle having a coating of barium oxide located on its periphery.

This composition of material is manufactured by the following steps:

A quantity of zirconia particles having a size preferably between 30–60 mesh is placed in a container and heat treated in an oven, illustrated by step 1 in FIG. 1. The temperature in the oven is raised to between 800°–900° C and maintained at this temperature for about 1 hour. This heat treatment allows the zirconia particles to expand and relieve any internal stresses which may have occurred during the manufacture of the zirconia.

Thereafter, as shown by step 2, the temperature in the oven is uniformly reduced to allow the zirconia particles to cool to between 100°–150° C. The zirconia particles are then removed from the oven and placed in a mixer.

As illustrated by step 3, in FIG. 1, barium peroxide particles are added to the zirconia particles in the mixer and blended therewith until a uniform mixture is obtained.

This uniform mixture is placed in a container and returned to the oven, as illustrated by step 4 in FIG. 1. The air in the oven is replaced with nitrogen and the temperature therein is raised to between 500°-600° C. This temperature is maintained for about 1 hour or until any water or moisture which may be in the mixture has completely evaporated. At this temperature, the barium peroxide melts and flows around the zirconia particles. Depending upon the size of the container, it may be necessary under some circumstances to stir the mixture to assure that all the zirconia particles are coated with the liquid barium peroxide. Thereafter, the temperature of the oven is uniformly increased to 850° C causing the barium peroxide coating to decompose to barium oxide. The barium oxide remains relatively stable since it does not react with nitrogen. However, it is speculated that a layer of barium zirconate is created along the interface between the periphery of the zirconia particle and the barium oxide. To assure that this stable condition is maintained, nitrogen gas continually flows through the oven. After a period of time, typically about 4 hours, the temperature in the oven is uniformly reduced and, as illustrated by step 5 in FIG. 1, the barium oxide coated zirconia particles are cooled to room temperature. During this cooling step, the flow of nitrogen gas continues to maintain the stability of the barium oxide. When the barium oxide cools, it forms a matrix which holds large quantities of the zirconia coated particles together. Therefore, in order to obtain a uniform particle size the entire quantity of barium oxide coated zirconia particles is passed through a grinder, as illustrated by step 6 in FIG. 1. As the ground barium oxide coated zirconia particles pass from the grinder they are carried to a mechanical sieve shaker where any residual barium oxide which has not bonded to the zirconia particle is removed. Thereafter, a uniformly sized barium oxide coated zirconia particle is removed and stored for later use in an oxygen extractor.

In order to evaluate oxide composition made according to the manufacturing process described in FIG. 1, the relationship of the barium oxide and zirconia particles were varied in the following examples:

EXAMPLE 1

Zirconia particles having a 40 mesh size were heat treated by heating to 850° C for 1 hour in an oven. These heat treated zirconia particles were cooled and placed in a blender and barium peroxide particles were added until a uniform mix having a ratio of about 2:1 was achieved. This uniform mixture was heated in an oven having a temperature of 600° C through which nitrogen gas was flowing at a rate of about 1 liter/min. After about an hour, any moisture contained in the mixture was evaporated, and barium peroxide melted and dispersed around zirconia particles. The temperature of the oven was increased to 850° C. When the temperature of the mixture reaches 850° C, the barium peroxide coating on the zirconia particles decomposes to barium oxide. At the end of 4 hours, the zirconia particles were coated with a barium oxide layer. Thereafter, the temperature of the oven was uniformly reduced and the mixture allowed to cool to about 40° C or room temperature. During this entire cooling procedure, the flow of nitrogen gas through the oven is continued to prevent the barium oxide from reacting with air which could be communicated to the oven. The mixture has an appearance of a large mass since the barium oxide forms a matrix during the cooling. This large mass of material is placed in a grinder having a set particle size of about 45 mesh. The ground material is placed on a sieve and shaken in a mechanical shaker to remove any residual barium oxide which is not bonded to the zirconia particles. After about 15 minutes the desired size barium oxide coated zirconia particles are essentially uniform in appearance and shape. From a quantative analysis, it was determined that the amount of barium oxide coating on the zirconia particle was about 6% of the total weight of the coated zirconia particle.

EXAMPLE 2

The same particle size and amount of zirconia used as in Example 1, was used in Example 2, however, the amount of barium oxide was increased in the blended mixture to about 3:1. Thereafter, the manufacturing procedure as described in Example 1 was followed. However, the particle size of the grinder was decreased to about the 50 mesh size. After passing through the sieve and shaker apparatus, a barium oxide coated zirconia particle having a uniform size and appearance was produced. From a quantative analysis, it was determined that the barium oxide coating on the zirconia particle accounted for about 20% by weight of the total weight of the coated zirconia particle.

EXAMPLE 3

In order to investigate the optimum barium oxide coating the same particle size and amount of zirconia as illustrated in Example 1 was used and the amount of barium oxide increased in the blended mixture to about 4:1. Thereafter, the same manufacturing procedure as described in Example 1 was used followed until the grinding. The particle size of the grinder was increased to about the 60 mesh size. After passing through the sieve and shaker apparatus, a barium oxide coated zirconia particle having a uniform size and appearance was produced. From a quantative analysis, it was determined that the barium oxide coating on the zirconia particle accounted for about 40% by weight of the total weight of the coated zirconia particle.

In order to evaluate the oxygen extraction capability of the composition of materials produced in Examples 1, 2 and 3, a quantity of each example as placed in an oxygen extractor apparatus similar to that disclosed in U.S. Pat. No. 3,720,501.

Figure 2:
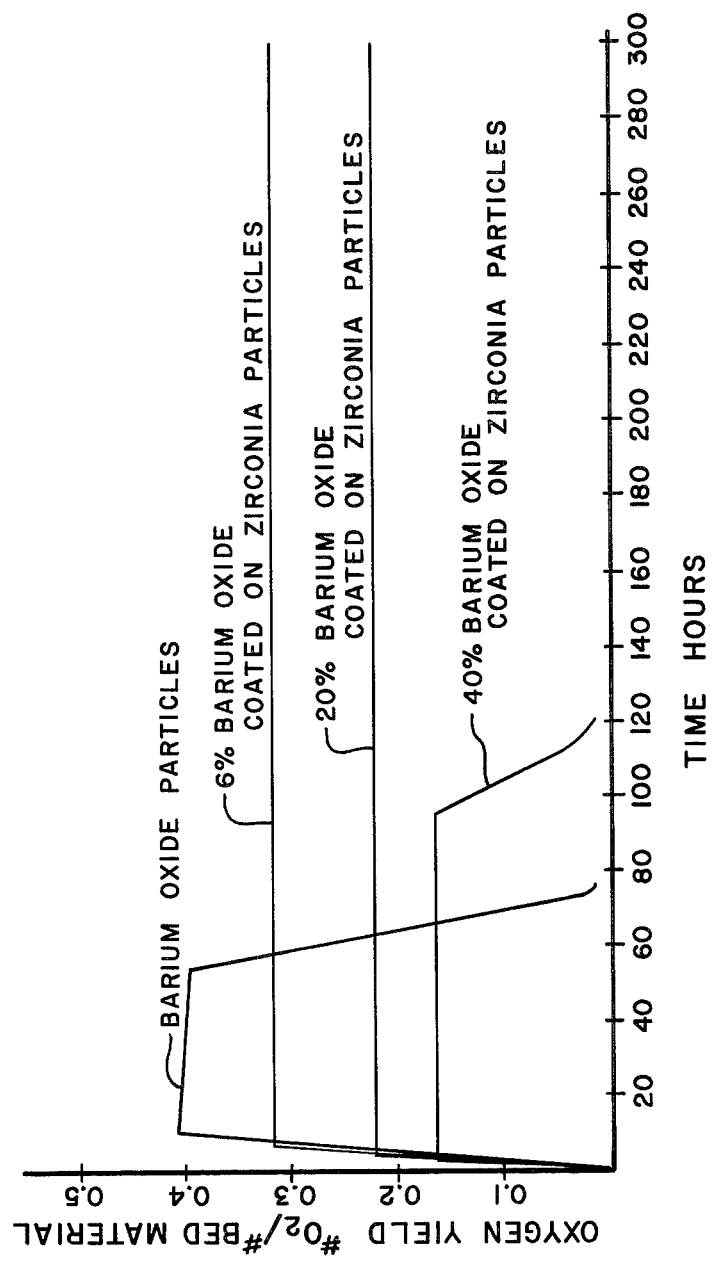
FIG. 2 is a graph showing the oxygen yield vs. operation time for a number of operation cycles.

The graph of FIG. 2 illustrates the effectiveness of the materials produced in Examples 1, 2 and 3 as compared to the effectiveness of barium oxide.

As seen in the graph, after 50 hours of continuous operation, the oxygen extraction capability of a bed of pure barium oxide particles deteriorates due to excessive amounts of heat generated during the reaction of oxygen in the input air with the barium oxide to produce barium peroxide. Once a bed of barium oxide particles start to cake or fuse together, the oxygen output falls off to a point where at about 70 hours the production is about 0.05 pounds of oxygen per hour/lb. bed material.

From the graph it should be evident that the most effective material for continuous oxygen production is that produced in Example 1. It is speculated that the 6% barium oxide by weight of the total mixture is just sufficient to coat the peripheral surface area of the zirconia particle with a thin layer of barium oxide. The heat generated by the surface reaction of the barium oxide with oxygen in the air is carried into the zirconia particle to maintain the temperature within the chamber below the melting point of the barium oxide. As illustrated in FIG. 2, this type of composition is capable of operating over 300 hours without a decrease in oxygen production.

The composition of material in Example 2, where the barium oxide is about 20% of the total weight of the bed material while providing continuous performance similar to Example 1 only produced about one-half of the oxygen output per unit of time.

The composition of material in Example 3, where the barium oxide is about 40% of the total weight of the bed material, while providing for continuous performance about twice as long as the barium oxide reference only produced about one-third the amount of oxygen per unit of time.

From these tests it was determined that: a composition of material made up of barium oxide coated zirconia particle could be used to extract oxygen from the air without deteriorating when continually used for a time period over 300 hours; the operational life of the composition of material decreased as the ratio of barium oxide to zirconia increased; and the zirconia particle has sufficient heat absorbing capability to stabilize the reaction temperature between barium oxide and oxygen in the air below the melting point of barium oxide to maintain the temperature in a reaction chamber at a substantially uniform temperature.

We claim:

1. A process of manufacturing an oxide material for use in an oxygen extractor, comprising the steps of:
    mixing a quantity of dry zirconia particles with a quantity of barium peroxide particles to create a blended mixture;
    heating said blended mixture in an oven to a temperature of between 500° to 600° C until said barium peroxide particles melt and coat the zirconia particles;
    uniformly increasing the temperature in the oven up to 850° C causing said peroxide coating to decompose to a barium oxide coating;
    cooling the barium oxide coated zirconia particles to room temperature; and
    passing the cooled barium oxide coated zirconia particles through a grinder to produce a desired particle size for said oxide material.

2. The process as recited in claim 1 further including the steps of:
    purging said blended mixture with nitrogen gas during said heating to maintain said barium oxide in a stable condition.

3. The process as recited in claim 2 further including the steps of:
    purging said barium oxide coated zirconia particles with nitrogen gas during said cooling to maintain the stable formation of oxide.

4. The process, as recited in claim 3 further including the steps of:
    maintaining the blended mixture at a temperature below the melting temperature of said barium peroxide for a time period sufficient to evaporate any water contained therein which could affect the coating of the zirconia particles by the barium oxide particles.

5. In an oxygen generator having an optimum operating range of between 750°-850° C, an oxide composition for reacting with pressurized air to form a higher oxide, said higher oxide reverting to oxide through the release of oxygen in the absence of pressurized air, said composition comprising:
    a zirconia particle; and
    a barium oxide coating surrounding said zirconia particle, said zirconia particle absorbing heat generated by the reaction of the oxide composition with air to stabilize the reaction temperature within the operating range of the oxygen generator.

6. The oxide composition, as recited in claim 5 further including:
    a layer of barium zirconate for forming a matrix which holds said barium oxide coating adjacent said zirconia particle.

7. The oxide composition, as recited in claim 4, wherein the ratio of the barium oxide coating to the zirconia particle varies in a range of 1% to 44% by weight.

8. The oxide composition, as recited in claim 7, wherein the zirconia particle size varies from 30 to 60 mesh.

9. A process for manufacturing an oxide material for use in an oxygen extractor, comprising the steps of:
    treating a quantity of zirconia particles in an oven to a temperature of between 800° to 900° C to remove any water contained therein;
    maintaining the temperature of the zirconia particles at 800° to 900° C for about 1 hour;
    cooling the dry zirconia particles to between 100° to 150° C;
    mixing the dry zirconia particles with a quantity of barium peroxide to create a blended mixture;
    heating said blended mixture in an oven to a temperature of between 500° to 600° C to melt said barium peroxide particles and cost the zirconia particles;
    uniformly increasing the temperature of the peroxide coated zirconia particles causing the barium peroxide coating to decompose to a barium oxide coating;
    cooling the barium oxide coated zirconia particle to about 40° C; and
    passing the cooled barium oxide coated zirconia particle through a grinder to produce a desired particle size for said oxide material.

10. The process as recited in claim 9 further including the step of:
    continually purging said oven with nitrogen to control the formation of the barium oxide coating on the zirconia particle.

* * * * *